(12) United States Patent (10) Patent No.: US 7,680,697 B2
Hearn et al. (45) Date of Patent: Mar. 16, 2010

(54) SEARCHING FOR A SELLER OF A PRODUCT

(75) Inventors: Lyndon Hearn, London (GB); Ben Jackson, Solihull (GB)

(73) Assignee: Kelkoo SAS, Paris (FR)

( * ) Notice: Subject to any disclaimer, the term of this patent is extended or adjusted under 35 U.S.C. 154(b) by 977 days.

(21) Appl. No.: 11/339,989

(22) Filed: Jan. 25, 2006

(65) Prior Publication Data

US 2007/0174133 A1 Jul. 26, 2007

(51) Int. Cl.
*G06Q 30/00* (2006.01)

(52) U.S. Cl. ...................................................... 705/26

(58) Field of Classification Search ................... 705/26, 705/27
See application file for complete search history.

(56) References Cited

U.S. PATENT DOCUMENTS

| | | | |
|---|---|---|---|
| 6,148,260 A | 11/2000 | Musk et al. | |
| 2002/0156779 A1* | 10/2002 | Elliott et al. | 707/6 |
| 2004/0102197 A1* | 5/2004 | Dietz | 455/456.1 |
| 2005/0256766 A1* | 11/2005 | Garcia et al. | 705/14 |
| 2006/0099963 A1* | 5/2006 | Stephens | 455/456.3 |
| 2006/0155609 A1* | 7/2006 | Caiafa | 705/26 |
| 2007/0136140 A1* | 6/2007 | Smith | 705/26 |
| 2007/0150369 A1* | 6/2007 | Zivin | 705/26 |
| 2008/0235174 A1* | 9/2008 | Scriffignano et al. | 706/52 |

FOREIGN PATENT DOCUMENTS

| | | |
|---|---|---|
| EP | 1072987 A1 | 1/2001 |
| WO | WO 00/41090 | 7/2000 |
| WO | WO 02/065331 A2 | 8/2002 |

OTHER PUBLICATIONS

Chris Gaither, "Amazon Decides to Become a Bricks-and-Mortar Booster; The online retailer enters into competition with Google, Yahoo and yellow pages", Los Angeles Times. Los Angeles, Calif.: Jan. 27, 2005. p. C.1 http://proquest.umi.com/pqdweb?did=784614051&sid=4&Fmt=3&clientId=19649&RQT=309&VName=PQD.*

* cited by examiner

*Primary Examiner*—Mila Airapetian
(74) *Attorney, Agent, or Firm*—Seth H. Ostrow; Ostrow Kaufman & Frankl LLP

(57) ABSTRACT

A method of searching for a seller of a product. The method comprises the steps of: indicating a product; indicating a geographical search location; and searching for a seller of the product that is located within a search distance of the geographical search location.

47 Claims, 5 Drawing Sheets

SEARCHING FOR A SELLER OF A PRODUCT

FIELD OF INVENTION

This invention relates to a method, system and computer program for searching for a seller of a product.

BACKGROUND OF THE INVENTION

There currently exist many providers of Internet search engines. Most of these providers present a user (or searcher) with a web-based interface through which the user enters one or more keywords. The keywords relate to the information that the user is searching for. A search engine then returns, as the results of the search, the webpages that appear to be relevant, which are then presented to the user, usually as a list of links to the webpages.

Whilst such Internet searches can provide useful results when the search is very targeted (i.e. when very specific keywords are used), it is often the case that keyword based searches return results which contain many webpages that are of no interest to the user.

Additionally, for some types of search that a user may wish to perform, keyword based searching does not provide a suitable mechanism for accurately representing the desired search.

Accordingly, improved searching techniques are desirable.

SUMMARY OF THE INVENTION

According to an aspect of the invention, there is provided a method of searching for a seller of a product, the method comprising the steps of: indicating a product; indicating a geographical search location; and searching for a seller of the product that is located within a search distance of the geographical search location.

Embodiments of the invention allow a user to perform a search for a seller of a particular product, which may be a good, a service or any other product. The search only looks for sellers that are situated within a given finite distance (or radius) of the location that the user has indicated, such as their home or work address. In this way, the user can find sellers that the user can easily visit. The term "seller" is taken to include, amongst other things, a merchant of a product, a third party selling a product on behalf of a current owner of the product, and an advertiser advertising a product for sale.

According to an embodiment of the invention, the method further comprises the step of indicating a seller to be searched for, wherein the step of searching further comprises searching for a seller that matches the indicated seller. In this way the searching perform by the user may be filtered, so that only sellers that match the indicated seller will be returned as search results. This match may be an exact match or a fuzzy match.

According to another aspect of the invention, there is provided a system for searching for a seller of a product, the system comprising: an interface operable to receive an indication of a product and an indication of a geographical search location; and a search engine operable to search for a seller of the product that is located within a search distance of the geographical search location.

In an embodiment of the invention, the system further comprises an offers database having one or more records, the or each record associating one or more products with a seller. The search engine uses the offers database to identify a seller of the product.

In an embodiment of the invention, the system comprises a sellers database having one or more records, the or each record associating one or more geographical locations with a seller. The search engine uses the sellers database to determine a geographical location for the identified seller.

According to another aspect of the invention, there is provided a computer program for searching for a seller of a product, the computer program, when executed by a computer, carrying out the steps of: receiving an indication a product; receiving an indication of a geographical search location; and searching for a seller of the product that is located within a search distance of the geographical search location. The computer program may be a computer program product embodied on a computer readable medium.

Further respective aspects of embodiments of the invention are defined in the appended claims.

BRIEF DESCRIPTION OF THE DRAWINGS

Embodiments of the invention will now be described, by way of example only, and without limitation, with reference to the accompanying drawings, in which.

DETAILED DESCRIPTION OF THE INVENTION

Figure 1:
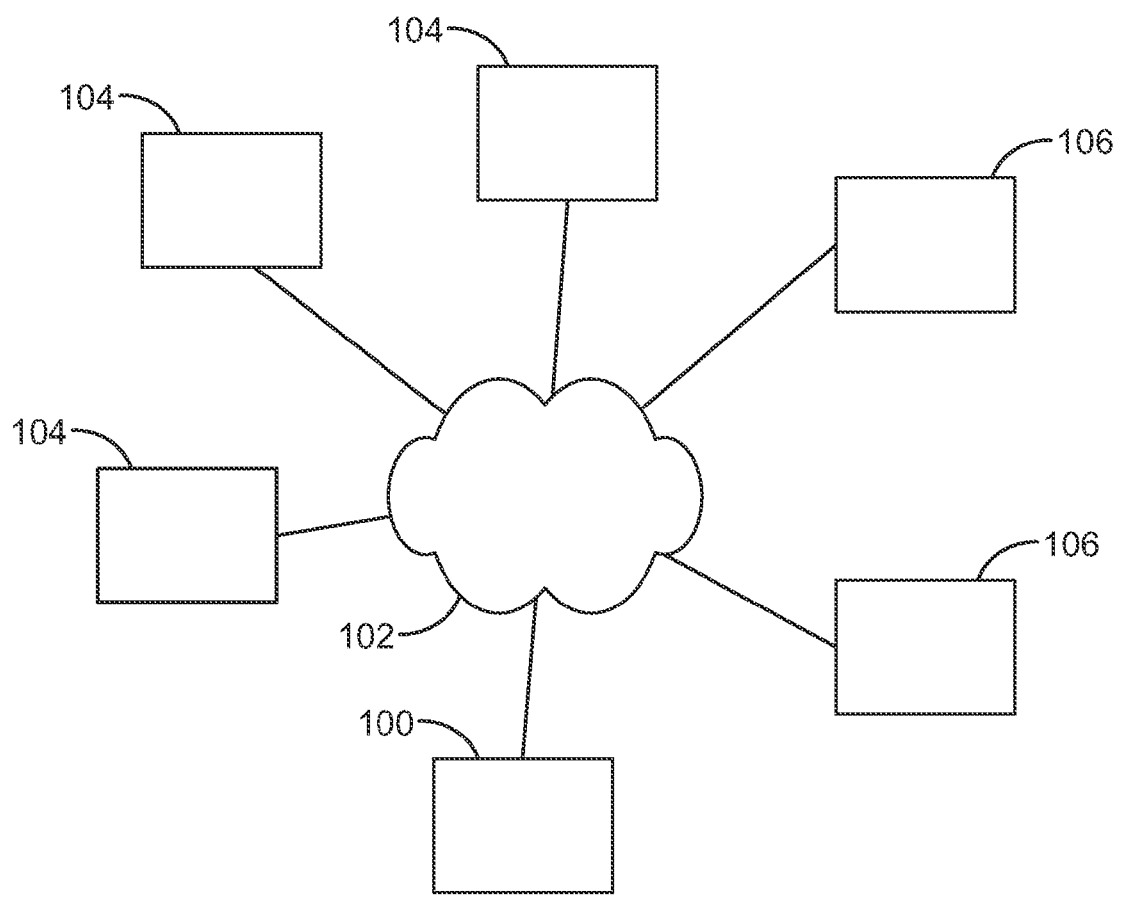
FIG. 1 illustrates the Internet.

FIG. 1 illustrates the Internet. A search system 100 according to an embodiment of the invention is connected to the Internet 102. A number of users 104 are also connected to the Internet 102, for example, via personal computers. Additionally, a number of sellers 106 are connected to the Internet 102, for example, via server computers. The term "seller" is taken to include, amongst other things, a merchant of a product, a third party selling a product on behalf of a current owner of the product, and an advertiser advertising a product for sale.

A seller 106 may provide a webpage that the users 104 can visit and which contains information about one or more products that the seller 106 is offering for sale. The term "product" is taken to include both goods and services. Indeed, the webpage may allow a user 104 to perform a financial transaction with the seller 106 via the Internet 102 to purchase a product that the seller 106 is selling. However, many users 104 currently prefer not to perform a financial transaction via the Internet 102 and would rather perform a financial transaction in person at a store or other physical location of the seller 106. Additionally, a user 104 may wish to see and/or try a product that a seller 106 is selling prior to actually purchasing the product. The user 104 would therefore need to visit a store of the seller 106 prior to purchasing the product. To this end, the search system 100 not only enables a user 104 to search for a seller 106 that sells a particular product, but also enables a user 104 to search for a seller of a product who is located (or who has a store located) within a distance, or search range, from a particular geographical search location. Suitable geographical search locations may be, for example, the home or business address of the user 104 or a current address of the user 104.

As will be described in more detail below, the search system 100 receives, from the user 104: (i) an indication of the geographical search location and (ii) an indication of a search product that the user 104 is interested in. The user 104 may also specify to the search system 100 the search distance. Alternatively, or if the user 104 does not specify a search distance, the search distance may be a predetermined default distance (for example, a 5 mile radius from the geographical search location). The search system 100 will return a results list to the user 104 containing details of any sellers 106 that it has found which sell the desired product and which are located within the search distance of the geographical search location.

Figure 2:
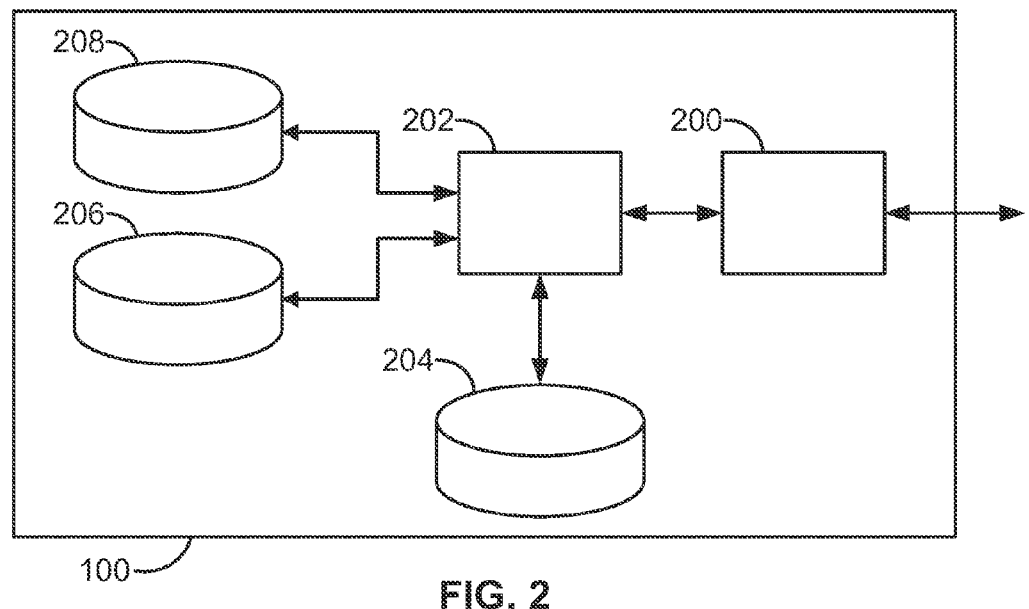
FIG. 2 illustrates a search system according to an embodiment of the invention.

FIG. 2 illustrates the search system 100 according to an embodiment of the invention. The search system is preferably a server computer running a computer program to carry out a search method, as will be described below. However, it will be appreciated that the search system may be spread across multiple computers and servers instead.

The search system 100 has an interface 200 for receiving data from and outputting data to the Internet 102 (and thus for receiving data from and outputting data to users 104 and/or sellers 106). The interface 200 communicates with a search engine 202, the search engine 202 making use of three databases: a seller database 204; an offers database 206; and a postcode database 208.

On receipt of a search request, the interface 200 passes the details of the search to the search engine 202. The search engine 202 uses the seller database 204, the offers database 206 and the postcode database 208 to perform the search. The search engine 202 returns the results of the search to the interface 200 which outputs the results to the user 104. This will be described in more detail below.

Figure 7:
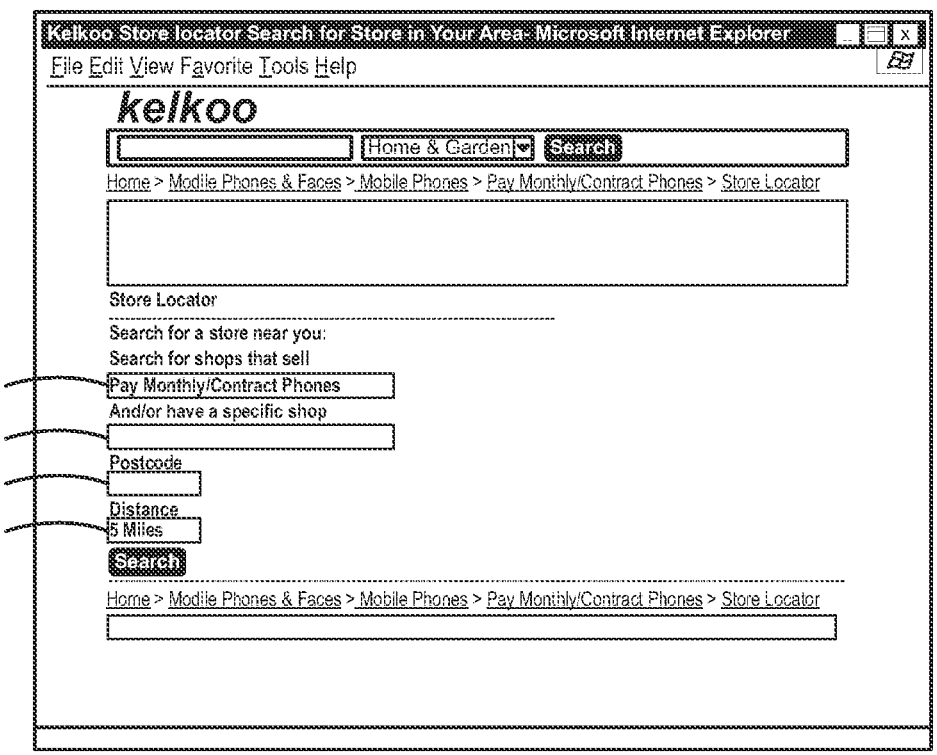
FIG. 7 shows an example of a webpage interface through which a user interacts with a search system according to an embodiment of the invention.

The interface 200 acts as an input mechanism for allowing a user 104 to input details of a search. For example, the interface 200 may provide a webpage accessible by the user 104 via the Internet 102 and with which the user 104 may interact to submit a search to the search system 100. An example of such a webpage is shown in FIG. 7. As shown in FIG. 7, the user 104 may input one or more of the following at the webpage:

(i) an indication of the product that they are interested in (at a product input box 700);

(ii) an indication of a specific seller 106 that they are interested in (at a seller input box 702)—this is a purely optional input for the user 104 and need not be used by the user 104 in specifying a search request;

(iii) an indication of a geographical search location which is to be the starting point of the search (at a location input box 704). The geographical search location may be indicated, for example, in the form of a postcode (or ZIP code); and (iv) a distance value (at a distance input box 706).

The interface 200 may provide the user 104 with a default value for the search distance in the distance input box 706 so that the user 104 need not provide a distance himself. The interface 200 may also provide the user 104 with a drop-down list of options for the distance at the distance input box 706. Alternatively, the distance input box 706 may allow the user 104 to simply type in a desired distance.

The search system 100 uses, internally, a single unit of measurement for distances, for example, meters. However, the user 104 may wish to enter the search distance at the distance input box 706 in a different unit of measurement, for example, miles. Therefore, the search system 100 is arranged to convert the distance entered by user 104 into the unit of measurement used internally by the search system 100 if such a conversion is required.

The interface 200 also acts as an output mechanism to return to the user 104 the results of the search. Again, this output may be in the form of a webpage, the webpage showing a list of the sellers 106 that sell the desired product and that are located within the search distance of the geographical search location. The interface 200 preferably arranges these results as an ordered list, ordered in accordance with the distance of each seller 106 (or a store of the seller 106) from the geographical search location.

The postcode database 208 contains records that associate a postcode with a two-dimensional coordinate in a two-dimensional coordinate system. The coordinate system uses the internal units of measurement of the search system 100. Given two postcodes, it is possible to determine the distance between the geographical locations associated with these postcodes. For example, from the information stored in the postcode database 208, a first postcode can be expressed as coordinate (x,y) and a second postcode can be expressed as coordinate (a,b). The distance between the geographical locations associated with the two postcodes is then $\sqrt{(x-a)^2+(y-b)^2}$.

It will be appreciated that the postcode database 208 may contain postcodes for a single geographical area, a single country or multiple countries. If postcodes for multiple countries are stored, then the postcode database 208 may store them in different formats according to different national postcode formats. For example, postcodes in the United States of America are in the form of a ZIP code whilst postcodes in the United Kingdom take a different form.

Additionally, if a partial (or incomplete) postcode is entered by the user 104, then the search system 100 is arranged to determine a representative location within the region represented by the partial postcode. For example, the user 104 may have indicated a geographical search region/area using a partial United Kingdom postcode of "SE2" rather than a full United Kingdom postcode of "SE2 9QZ".

To determine a representative location within an indicated region, the postcode database 208 may contain, for each partial postcode, a two-dimensional coordinate of such a representative location. Alternatively, the search system 100 may search the postcode database 208 for all postcodes that start with the partial postcode and determine the minimum and maximum values for each of the two coordinates associated with these postcodes, namely $x_{min}$ and $x_{max}$ for the first coordinate and $y_{min}$ and $y_{max}$ for the second coordinate. The geographical search location is then determined by the search system 100 to be the representative location of $((x_{min}+x_{max})/2,(y_{min}+y_{max})/2)$, i.e. a central (or mean or average) point within the area represented by the partial postcode.

Figure 3:
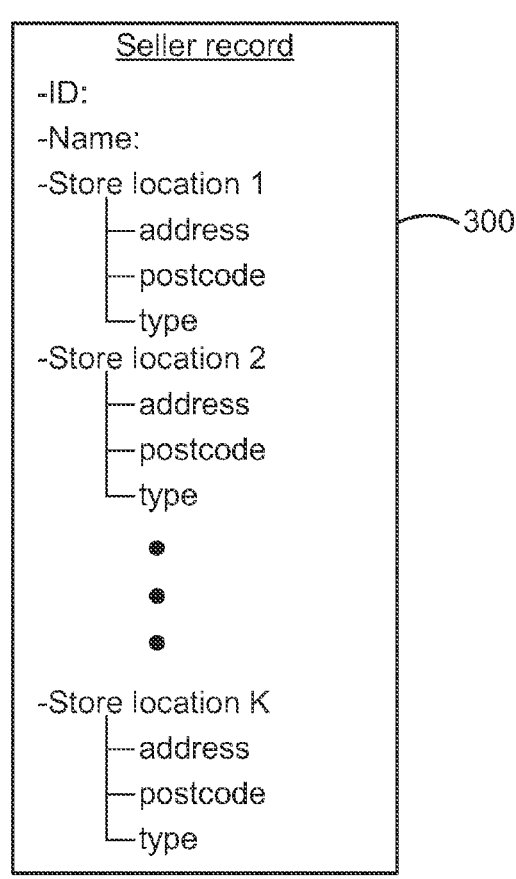
FIG. 3 is an illustration of a record in a seller database according to an embodiment of the invention.

The seller database 204 contains one or more records, each record containing details about a particular seller 106. FIG. 3 is a illustration of a record 300 in the seller database 204. Preferably, the record 300 contains the following information:

(i) An identification number (ID) for the seller 106—this is a unique number assigned to the seller 106 when the record 300 is first generated for that particular seller 106.

(ii) The name of the seller.

(iii) One or more store locations for the seller 106.

The seller 106 may have multiple stores at different geographical locations. Therefore, the record 300 stores geographical information about the location of the stores of the seller 106, in particular the address and postcode. Additionally, the record 300 stores information about the type of each store, for example, whether the store is a retail outlet, a warehouse, an administrative office, etc.

The offers database 206 contains one or more records, each record associating a seller 106 with a product sold by that seller 106. The offers database 206 may be in the form of a relational database so that flexible search queries can be made to the offers database 206. For example, a query can be made to the offers database 206 for all of the sellers 106 that sell a particular product, or for all products sold by a particular seller 106. The seller 106 in the offers database 206 may be identified by their identification number stored in the seller database 204 in order to link the records in the two databases.

Figure 4:
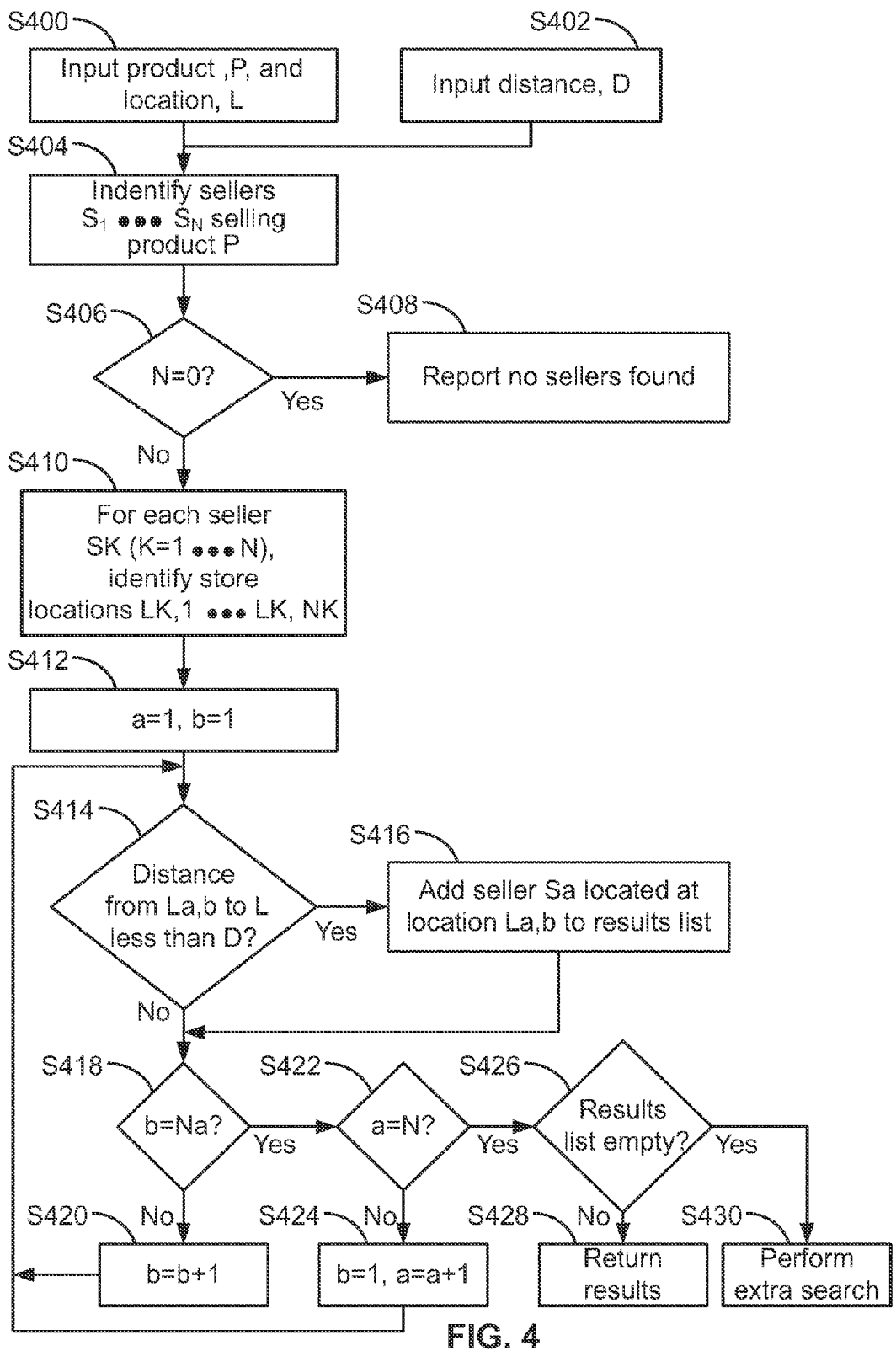
FIG. 4 is a flowchart illustrating the processing performed by a search engine according to an embodiment of the invention.

FIG. 4 is a flowchart illustrating the processing performed by the search engine 202.

At step S400, the search engine 202 receives an indication of the product P and geographical search location L. The product P and the geographical search location L are delivered to the search engine 202 from a user 104 via the interface 200.

At step S402, the search engine 202 receives a search distance D. This distance D may have been specified by the user 104 via the interface 200 or may be a default predetermined distance used by the search engine 202 if the user 104 has not specified the distance D.

At step S404, the search engine 202 searches for the product P in the offers database 206 and identifies which sellers $S_1 \ldots S_N$ sell the product P. Here, N represents the number of sellers 106 that have been found in the offers database 206 that sell the product P.

If at step S406, it is determined that N=0, (i.e. that no sellers 106 have been found that sell the product P), then processing continues at step S408. At step S408, the search engine 202 reports to the interface 200 that no sellers 106 have been found. The interface 200 then provides this information to the user 104, for example, by providing a webpage that indicates that no sellers 106 have been found that sell the product P.

If, at step S406, it is determined that N>0, (i.e. that at least one seller 106 has been found that sells the product P), then processing continues at step S410. At step S410, the search engine 202 identifies, from the sellers database 204, the geographical location of each of the stores of those sellers 106 identified at step S404. In particular, for each of the sellers $S_k$ (k=1 ... N), store locations $L_{k,1} \ldots L_{k,Nk}$ are identified, where Nk is the number of store locations in the record 300 for the store $S_k$. Each location $L_{k,i}$ identified is in the form of a postcode.

At step S412, two counters a and b are initialised to be 1. The counter a represents a current seller 106 that is being analysed by the search engine 202. Hence the counter a will vary from 1 to N. The counter b represents a current store of the current seller $S_a$ that is being analysed by the search engine 202. Hence the counter b will vary from 1 to Na.

At step S414, the distance between the input geographical search location L and the location $L_{a,b}$ of the b-th store of the seller $S_a$ is determined. This is done based on the postcodes for the geographical search location L and the location $L_{a,b}$ using the method described above. If the distance determined is less than the input distance D, then processing continues at step S416; otherwise, processing continues at step S418.

At step S416, the seller $S_a$ is added to a results list, together with an indication that it is the b-th store of the seller $S_a$ that is within the distance D of the geographical search location L. Processing then continues at step S418.

At step S418, it is determined whether the last store for the current seller $S_a$ has been analysed, i.e. whether b=Na. If the last store for the current seller $S_a$ has not been analysed (i.e. b≠Na), then processing continues at step S420, at which the counter b is incremented by 1, before processing returns to step S414.

If, however, it is determined at step S418 that the last store for the current seller $S_a$ has been analysed (i.e. b=Na), then processing continues at step S422 at which it is determined whether the last seller 106 has been analysed, i.e. whether a=N. If the last seller 106 has not been analysed (i.e. a≠N), then processing continues at step S424, at which the counter b is reset to 1 and the counter a is incremented by 1, before processing returns to step S414.

If, however, it is determined at step S422 that the last seller 106 has been analysed (i.e. a=N), then processing continues at step S426 at which it is determined whether the results list is empty.

If it is determined at step S426 that the results list is not empty, then processing continues at step S428 at which the results are returned from the search engine 202 to the interface 200. The interface 200 then returns the results to the user 104, for example via a results webpage as has been described above.

However, if it is determined at step S426 that the results list is empty, then processing continues at step S430 at which an extra search is performed. This will be described in detail below with reference to FIGS. 5 and 6. However, it will be appreciated that this extra search is purely optional and some embodiments may not perform this extra search, in which case, at step S430, instead of performing the extra search, the search engine 202 simply reports that no sellers 106 have been found that sell the product P and that are located within the distance D of the geographical search location L. This is performed in a similar manner to the processing at step S408.

Figure 5:
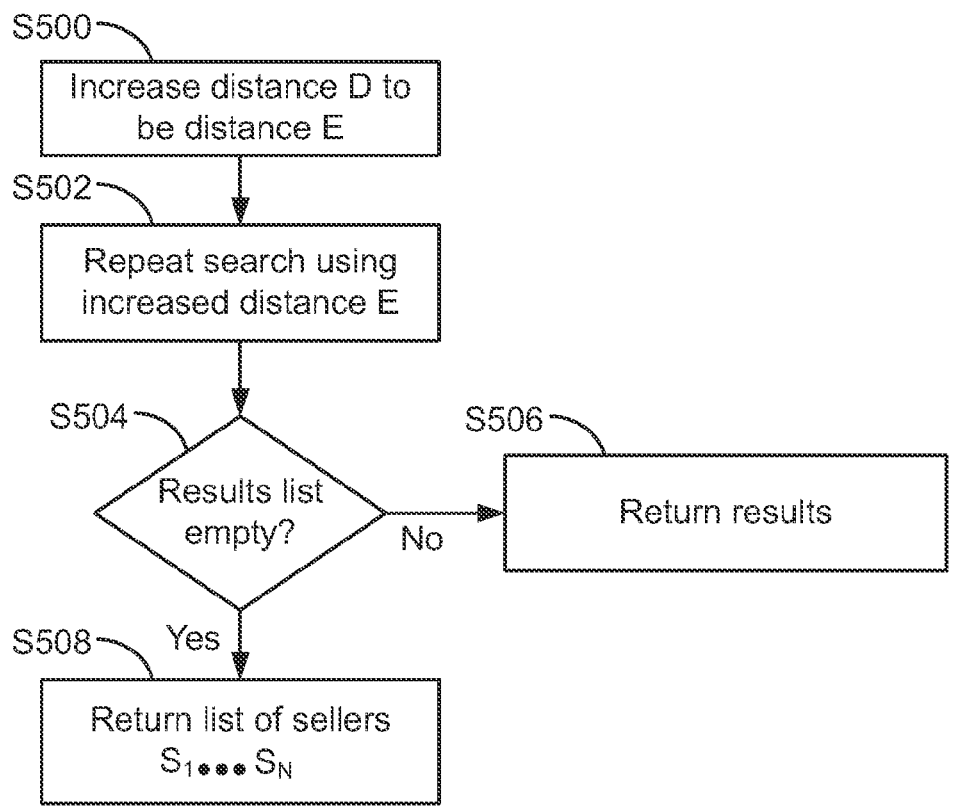
FIG. 5 is a flowchart illustrating the processing performed by a search engine when performing an extra search according to an embodiment of the invention.
Figure 6:
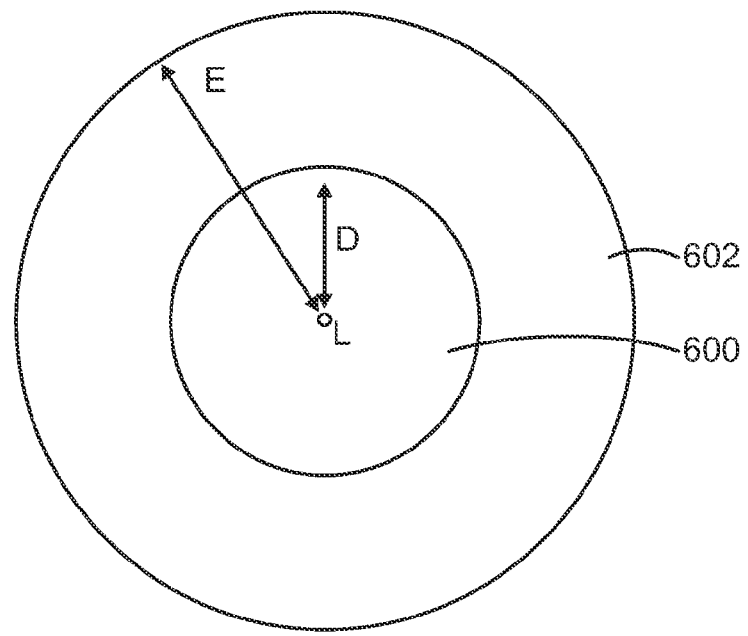
FIG. 6 illustrates an extra search according to an embodiment of the invention.

FIG. 5 is a flowchart illustrating the processing performed by the search engine 202 at step S430 of FIG. 4 when performing an extra search. FIG. 6 illustrates the extra search. As described above, the extra search is performed if the search engine 202 has not found any sellers 106 selling the product P that are located within the distance D of the geographical search location L, i.e. within an area 600 as shown in FIG. 6.

Therefore, at step S500, an extended distance E is determined from the distance D. The extended distance E is larger than the distance D and may be determined, for example, by (i) adding a predetermined increment (such as 10 miles) to the distance D or (ii) by multiplying the distance D by a predetermined factor (such as 1.5 or 2.0), or by any other suitable method.

At step S502, the search engine 202 searches for sellers 106 that sell the product P and that are located within the extended distance E of the geographical search location L, i.e. for sellers 106 located within an area 602 as shown in FIG. 6. This search is performed according to steps S404 to S424 of FIG. 4, but using the extended distance E instead of the distance D. The search engine 202 may store the information ascertained at steps S404 and S410 for the initial search, in which case the extra search is performed according to steps S412 to S424, using the extended distance E instead of the distance D.

If it is determined at step S504 that at least one seller 106 has been found that sells the product P and that is located within the extended distance E of the geographical search location L, then, at step S506, the results of the search are returned by the search engine 202. This is performed in the same way as at step S428.

If however it is determined at step S504 that no sellers 106 have been found that sell the product P and that are located within the extended distance E of the geographical search location L, then, at step S508, the list of sellers $S_1 \ldots S_N$, that was originally identified at step S404, is preferably returned to the user 104 by the search engine 202. This is done in the same way as at step S428. In this way, it is as if a search for the sellers 106 that sell the product P, but which are located at any distance from the geographical search location L, has been performed (by virtue of step S404).

The interface 200, when outputting the search results to the user 104, indicates, for the appropriate store of each seller 106 in the results list, the distance from the store to the geographical search location L. This is particularly useful if the extra search has been performed based on the extended distance E, or if the results are based on sellers 106 that are located at any distance from the geographical search location L. Additionally, the interface 200 may indicate to the user 104 that an extra search has been performed. The distance may be indicated in the particular unit of measurement used internally by the search engine 202 or in any other suitable unit of measurement, for example, the unit of measurement used by the user 104 when instigating the search.

As illustrated in FIG. 7, the user 104 may specify a particular seller 106 that the user 104 wishes to search for. In this case, the processing for FIG. 4 is changed so that, at step S404, the search engine 202 identifies sellers 106 whose names match the input of the input box 702 and that sell the product P. The name matching may be based on an exact match or may be based on fuzzy text matching.

It will be appreciated that other embodiments may have various alternatives to the embodiment described above. For example, each record 300 in the seller database 204 may record the location of a store as a two-dimensional coordinate, rather than a postcode. In this embodiment, when a record 300 is created or updated, the postcode database 208 is used to obtain the two-dimensional coordinate associated with the postcode of a store of the seller 106 and this coordinate is stored in the record 300 for that seller 106.

Furthermore, in an alternative embodiment, the search system 100 uses a separate index that stores records associating the identification number of a seller 106 with one or more two-dimensional coordinates. This index is used by the search engine 202 during searching instead of the seller database 204, with the seller database 204 only being used to provide information about a seller 106 once that seller 106 has been added to the results list for a search. This index is created and maintained as records are added to or updated in the seller database 204.

Additionally, the output of the interface 202 may indicate, for the stores of the sellers 106 in the results list, the type of the store. This will help the user 104, for example, to decide whether they can visit the seller 106 at that store to purchase a product, or whether that store is merely an administrative office.

Whilst the method for determining the distance between two postcodes and/or partial postcodes has been described with reference to a two-dimensional coordinate system, it will be appreciated that other coordinate systems may be used. For example, a three dimensional coordinate system may be used. With such a system, the distance determined would take into account the physical landscape, such as hills. Alternatively, a route-finding algorithm could be used. This could determine the actual distance along the roads and paths that would have to be walked or driven in order for the user 104 to move from a first postcode location to a second postcode location.

It will be appreciated that, whilst the search system 100 has been described in relation to use via the Internet 102, it need not be restricted to such use. Indeed, the search system 100 may be used in conjunction with any suitable form of network. Alternatively, the present invention may be embodied as stand-alone computer program running on a user's personal computer. The program may access databases stored on the Internet or other networks, or database updates may be sent to the user 104 for storage on his personal computer.

Insofar as embodiments of the invention are implemented by a computer program, it will be appreciated that a medium carrying the computer program is a computer readable storage medium.

We claim:

1. A computerized method of searching for a seller of a product, the method comprising the steps of:
   electronically assigning a unique identifier for the seller;
   associating the unique identifier with one or more two-dimensional geographical coordinates;
   storing information regarding the seller in an index on one or more server computers;
   indicating a product;
   indicating a geographical search location; and
   electronically searching, using a server computer, for a seller of the product that is located within a search distance of the geographical search location based on a comparison of the geographical search location and the one or more two-dimensional coordinates associated with the seller.

2. A method according to claim 1, in which the step of searching comprises the steps of:
   identifying a seller of the product; and
   determining whether the identified seller is located within the search distance of the geographical search location.

3. A method according to claim 2, in which the step of searching further comprises the steps of:
   determining a geographical location for the identified seller; and
   determining the distance between the geographical search location and the geographical location determined for the identified seller.

4. A method according to claim 2, in which the step of identifying a seller comprises using a database having one or more records, each record associating one or more products with a seller.

5. A method according to claim 3, in which the step of determining a geographical location for the identified seller comprises using a database having one or more records, each record associating one or more geographical locations with a seller.

6. A method according to claim 2, in which the step of searching further comprises the steps of:
   determining a plurality of geographical locations for the identified seller; and
   determining the distance between each of the geographical locations determined for the identified seller and the geographical search location.

7. A method according to claim 3, in which determining the distance between the geographical search location and the geographical location determined for the identified seller comprises the steps of:
   expressing the geographical search location as a two-dimensional coordinate;
   expressing the geographical location determined for the identified seller as a two-dimensional coordinate; and
   determining the distance between the two-dimensional expression of the geographical search location and the two-dimensional expression of the geographical location determined for the identified seller.

8. A method according to claim 1, in which the geographical search location is indicated as a postcode.

9. A method according to claim 8, further comprising the step of:
if the geographical search location is specified as an incomplete postcode, setting the geographical search location as a representative point of an area represented by the incomplete postcode.

10. A method according to claim 9, in which the representative point is a central point of the area represented by the incomplete postcode.

11. A method according to claim 1, in which indicating a geographical search location comprises indicating a geographical search region and wherein the geographical search location is determined as a point representative of the geographical search region.

12. A method according to claim 1, comprising the step of:
if the step of searching for a seller returns no results, presenting an option to perform an extended search for a seller of the product that is located within an extended distance, greater than the search distance, of the geographical search location; and
upon opting to perform an extended search, indicating through an interface that the search is extended.

13. A method according to claim 12, in which the extended distance is equal to a sum of the search distance and a predetermined increment distance.

14. A method according to claim 12, in which the extended distance is equal to the product of the search distance and a predetermined multiplication factor.

15. A method according to claim 12, in which, if the step of performing an extended search does not result in finding at least one seller of the product that is located within the extended distance of the geographical search location, searching for a seller of the product that is located at any distance from the geographical search location.

16. A method according to claim 1, further comprising the step of indicating a seller to be searched for, wherein the step of searching further comprises searching for a seller that matches the indicated seller.

17. A method according to claim 1, further comprising the step of:
presenting the results of the search to a user.

18. A method according to claim 17, further comprising the step of:
ordering the results of the search according to the distance of the location of a seller from the geographical search location.

19. A method according to claim 1, in which the product is indicated by a user.

20. A method according to claim 1, in which the geographical search location is indicated by a user.

21. A method according to claim 1, further comprising the step of a user specifying the search distance.

22. A method according to claim 1, in which the search distance is a predetermined default distance.

23. A method according to claim 1, in which the product is one or more of a good and a service.

24. A system for searching for a seller of a product, the system comprising:
one or more server computers for storing information regarding the seller in an index;
an interface operable to receive an indication of a product and an indication of a geographical search location; and
a search engine, executing on a server computer, operable to search for a seller of the product that is located within a search distance of the geographical search location based on a comparison of the geographical search location and the one or more two-dimensional geographical coordinates associated with the seller.

25. A system according to claim 24, in which the search engine is operable to:
identify a seller of the product; and
determine whether the identified seller is located within the search distance of the geographical search location.

26. A system according to claim 25, in which the search engine is further operable to:
determine a geographical location for the identified seller; and
determine the distance between the geographical search location and the geographical location determined for the identified seller.

27. A system according to claim 25, further comprising an offers database having one or more records, each record associating one or more products with a seller.

28. A system according to claim 26, further comprising a sellers database having one or more records, each record associating one or more geographical locations with a seller.

29. A system according to claim 25, in which the search engine is operable to:
determine a plurality of geographical locations for the identified seller; and
determine the distance between each of the geographical locations determined for the identified seller and the geographical search location.

30. A system according to claim 26, in which the search engine is operable to:
express the geographical search location as a two-dimensional coordinate;
express the geographical location determined for the identified seller as a two-dimensional coordinate; and
determine the distance between the two-dimensional expression of the geographical search location and the two-dimensional expression of the geographical location determined for the identified seller.

31. A system according to claim 24, in which the geographical search location is received at the interface as a postcode.

32. A system according to claim 31, in which the search engine is operable, if the geographical search location is specified as an incomplete postcode, to set the geographical search location as a representative point of an area represented by the incomplete postcode.

33. A system according to claim 32, in which the representative point is a central point of the area represented by the incomplete postcode.

34. A system according to claim 24, in which, if the interface receives an indication of a geographical search location that indicates a geographical search region, then the search engine is operable to determine the geographical search location as a point representative of the geographical search region.

35. A system according to claim 24, in which the search engine is operable, if the searching for a seller returns no results, to present an option to perform an extended search for a seller of the product that is located within an extended distance, greater than the search distance, of the geographical search location; and upon opting to perform an extended search, indicating through the interface that the search is extended.

36. A system according to claim 35, in which the extended distance is equal to a sum of the search distance and a predetermined increment distance.

37. A system according to claim 35, in which the extended distance is equal to the product of the search distance and a predetermined multiplication factor.

38. A system according to claim 35, in which the search engine is operable, if the extended search does not result in finding at least one seller of the product that is located within the extended distance of the geographical search location, to search for a seller of the product that is located at any distance from the geographical search location.

39. A system according to claim 24, in which the interface is operable to receive an indication of a seller to be searched for, the search engine being operable to search for a seller that matches the indicated seller.

40. A system according to claim 24, wherein the interface is further operable to present the results of the search to a user.

41. A system according to claim 40, in which the results of the search are ordered according to the distance of the location of a seller from the geographical search location.

42. A system according to claim 24, in which the interface is operable to receive the indication of the product from a user.

43. A system according to claim 24, in which the interface is operable to receive the indication of the geographical search location from a user.

44. A system according to claim 24, in which the interface is operable to receive a user-specified distance and to set the search distance as the user-specified distance.

45. A system according to claim 24, in which the search distance is a predetermined default distance.

46. A system according to claim 24, in which the product is one or more of a good and a service.

47. A computer program stored on a computer readable medium having executable instructions for searching for a seller of a product, the computer program, when executed by a computer, carrying out the steps of:
assigning a unique identifier for the seller;
associating the unique identifier with one or more two-dimensional geographical coordinates;
storing information regarding the seller in an index on one or more server computers;
receiving an indication a product;
receiving an indication of a geographical search location; and
searching for a seller, using a server computer, of the product that is located within a search distance of the geographical search location based on a comparison of the geographical search location and the one or more two-dimensional coordinates associated with the seller.

* * * * *